United States Patent [19]

Adams

[11] Patent Number: 5,057,468

[45] Date of Patent: Oct. 15, 1991

[54] CATALYTIC DISTILLATION STRUCTURE

[75] Inventor: John R. Adams, Houston, Tex.

[73] Assignee: Chemical Research & Licensing Company, Houston, Tex.

[21] Appl. No.: 526,444

[22] Filed: May 21, 1990

[51] Int. Cl.$^5$ .............................................. B01J 35/04
[52] U.S. Cl. ................................ 502/1; 203/DIG. 6; 502/527
[58] Field of Search .............. 502/527, 1; 203/DIG. 6

[56] References Cited

U.S. PATENT DOCUMENTS

| 3,634,534 | 8/1969 | Haunschild | 260/677 A |
|---|---|---|---|
| 4,215,011 | 7/1980 | Smith, Jr. | 252/426 |
| 4,232,177 | 11/1980 | Smith, Jr. | 585/324 |
| 4,242,530 | 12/1980 | Smith, Jr. | 585/510 |
| 4,250,052 | 2/1981 | Smith, Jr. | 252/426 |
| 4,302,356 | 11/1981 | Smith, Jr. | 252/426 |
| 4,307,254 | 12/1981 | Smith, Jr. | 568/697 |
| 4,336,407 | 6/1982 | Smith, Jr. | 568/697 |
| 4,439,350 | 3/1984 | Jones, Jr. | 502/527 |
| 4,443,559 | 4/1984 | Smith, Jr. | 502/527 |
| 4,471,154 | 9/1984 | Franklin | 585/864 |
| 4,482,775 | 11/1984 | Smith, Jr. | 585/671 |
| 4,536,373 | 8/1985 | Jones, Jr. | 422/211 |
| 4,847,430 | 7/1989 | Quang et al. | 568/697 |
| 4,847,431 | 7/1989 | Nocca et al. | 568/197 |

FOREIGN PATENT DOCUMENTS 2096603 10/1982 United Kingdom .
2096604 10/1982 United Kingdom .

Primary Examiner—W. J. Shine
Assistant Examiner—Douglas J. McGinty
Attorney, Agent, or Firm—Kenneth H. Johnson

[57] ABSTRACT

The present invention provides catalytic distillation structures which are useful in the concurrent reaction and distillation of a reaction mixture. The distillation structures are provided as rigid containers having a volume substantially smaller than the volume of conventional distillation column reactors. The catalyst component is loaded into the containers and the containers are closed. Openings are provided to allow vapor and liquid passage into and out of the containers. The surfaces of the containers provide the necessary/vapor liquid contact surfaces for the distillation. The rigidity of the containers provides for spacing the structures and the necessary free space for the distillation.

17 Claims, 1 Drawing Sheet

CATALYTIC DISTILLATION STRUCTURE

BACKGROUND OF THE INVENTION

1. Field of the Invention

The present invention relates to structures which can be used in reactions wherein the reaction and distillation of the reaction mixture are carried on concurrently using the structures as both catalyst for the reaction and as distillation structures. More particularly the present invention relates to a rigid container having distillation surfaces thereon, the container being filled with a particulate catalyst component.

2. Related Art

A new method of carrying out catalytic reactions has been developed, wherein the components of the reaction mixture are concurrently separable by fractional distillation. Several systems have been proposed and one commercially successful uses the catalyst as the catalytic distillation structure. Such a system is variously described in U.S. Pat. Nos. 4,215,011; 4,232,177; 4,242,530; 4,250,052; 4,302,356; 4,307,254; 4,336,407; 4,439,350; 4,443,559; and 4,482,775 commonly assigned herewith.

Briefly, the commercial structure described therein comprises a cloth belt with a plurality of pockets spaced along the belt and containing particulate catalyst material. The cloth belt with catalyst filled pockets is wound into a helix about a spacing material such as knitted stainless steel wire mesh, and these "bales" loaded into a distillation column. Additionally U.S. Pat. Nos. 4,443,559 and 4,250,052 disclose a variety of catalyst structures for this use.

Placing the particulate catalyst loose on standard distillation trays has also been proposed. See, for example, U.S. Pat. No. 4,215,011 and U.K. patents GB 2,096,603 and 2,096,604. The placement of the catalyst in the downcomers of standard distillation columns has been proposed as in U.S. Pat. 3,634,534. Fluidization of the catalyst on the trays has also been suggested as in U.S. Pat. No. 4,471,154. Some deficiencies of such fluidized beds were recognized in Chemiker Zeitung Chemische Apparatur, vol. 90, no. 13, July 1966 and U.S. Pat. No. 4,215,011. Quang, et al, in U.S. Pat. No. 4,847,430 and Nocca, et al in U.S. Pat. No. 4,847,431 disclose loading the particulate catalyst on alternating trays of a distillation column and with a gas by pass about the catalyst loaded trays.

So far, the most commercially successful arrangement has been to the place the particulate catalyst in closed pockets disposed along a fiber glass cloth belt.

The main problems sought to be overcome by the improvements have been the reduction of pressure drop through the column and provision of sufficient contact of the reactants with the catalyst while providing for good vapor liquid contact for the fractional distillation. Many useful catalysts are in the form of fine particulate powders which preclude their use directly as distillation components. Even larger extruded pellets do not lend themselves well as distillation structures. Hence the use of cloth belts, cages and support trays. While larger catalysts structures have been proposed, the porosity requirements of many catalytic materials limit their structural integrity. Many catalysts which rely on outer surface activity only and which might have the strength for larger structures are useful only for gas phase reactions, such as maleic anhydride production.

SUMMARY OF THE INVENTION

The present invention provides catalytic distillation structures which are useful in the concurrent reaction and distillation of a reaction mixture. The distillation structures are provided as small rigid containers. The catalyst component is loaded into the containers are and the containers closed. Although the containers are closed, openings are provided to allow vapor and liquid passage into and out of the containers. A multitude of catalyst containers are placed into a distillation column which then becomes a reactor/distillation column. The surfaces of the containers provide the necessary vapor/liquid contact surfaces for the distillation. The rigidity of the containers provides for spacing the structures and the necessary free space for the distillation.

DESCRIPTION OF THE PREFERRED EMBODIMENTS

Figure 1:
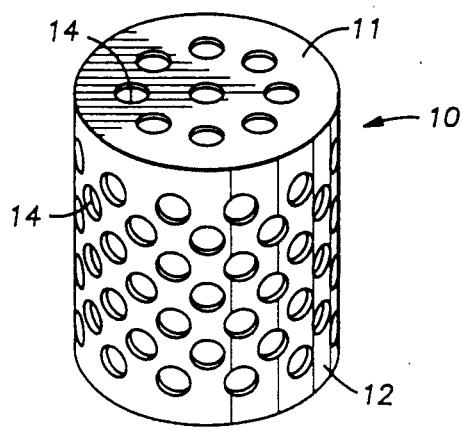
FIG. 1 is a depiction of a cylindrical catalytic distillation structure container having circular openings in the ends and wall.

The present invention provides catalytic structures which can be used as distillation structures. In order to serve both functions there are three highly desirable criteria. First, the structure should be such as to provide for relatively even spatial dispersion in the distillation column reactor. That is, the catalyst structures rest in the column in a geometric arrangement which will perform the desired functions of reaction and distillation sites. To achieve this these structures may be such as to provide fairly uniform spatial distribution in the column.

A second criteria is that there be sufficient free space in the catalyst bed to allow for the liquid phase contact and vapor phase distillation with the concurrent separation of the material in the column by the distillation into vapor and liquid phases. It has been observed that in the catalyst bed a free space of about 50 volume percent is adequate to obtain operable fractionation.

A third criteria is for the catalyst bed to be able to expand and contract during use without undue attrition of the catalyst.

The criteria are met by providing rigid containers containing the catalyst component. The containers may be of convenient size and shape so as to resemble common distillation column packing such as pall rings, burls, saddles, etc. Most preferably the containers are cylindrical in shape and have a volume for containing the catalyst component of about ½ to 64 fluid ounces. The size of the containers is thus very small, e.g. $1 \times 10^{-7}$ to $7 \times 10^{-5}$ the volume of conventional distillation column reactors into which they are placed.

The walls and/or ends of the cylindrical containers are provided with openings to allow the liquid and vapor to contact the catalyst component for reaction. The surfaces of the containers provide the distillation surface for gas/vapor contact.

Depending upon the size of the particulate catalyst, the openings may be sized to prevent the particles from escaping the container. Extremely fine catalytic materials might be contained within the cylinders by a porous liner. Even with the liner, the advantages of the rigidity of the catalytic structure is retained with the distillation surfaces exposed.

The volume of the catalyst loaded into the containers will depend upon its reaction to wetting. One common acidic ion exchange resin used—Amberlyst 1513 swells up to 20-30 percent upon wetting, while another—CT-175—swells only 10 to 15 percent. Crystalline zeolites swell hardly at all upon wetting.

The uniformity and spatial relationship will depend upon the size of the containers and the loading procedure used. A typical ½ fluid ounce cylindrical container is about 1½ inches by ¾ inch—a L/D ratio of 2. Such containers could be randomly poured into a column like standard distillation packing and would be expected to provide the necessary spatial relationship and free space. Larger containers (64 fluid ounces) might require hand loading of individual containers to assure even spacing with the required free space. While other geometrical shapes for the containers are contemplated to be covered, manufacture and filling of cylindrical containers is expected to be more easily practiced.

Referring now to the figures, various embodiments of the present invention are shown. In FIGS. 1-6 the container 10 of the catalytic distillation structure is shown to be substantially in the form of a hollow cylinder having openings in the ends 11 and wall 12 to allow free flow of liquid and vapor into and out of the container.

The cylindrical containers should be of a rigid material that is able to hold its integrity even with the openings. Additionally, the materials of construction of the container must be able to withstand the environment within a distillation column reactor. Any of the various grades of stainless steel or some of the newer plastics which are available would be suitable depending upon the service.

Figure 2:
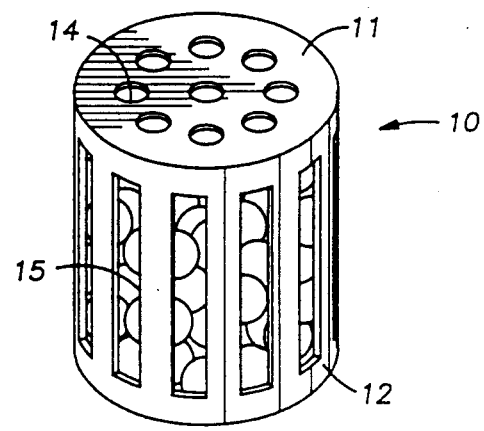
FIG. 2 is a depiction of a cylindrical catalytic distillation structure container having circular openings in the ends and longitudinal slotted openings in the wall.
Figure 3:
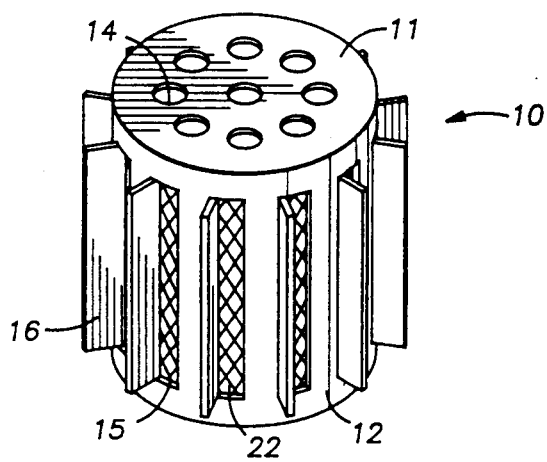
FIG. 3 is a depiction of the cylindrical catalytic distillation structure container of FIG. 2 having radially extending fins along one side of each of the slotted openings.
Figure 4:
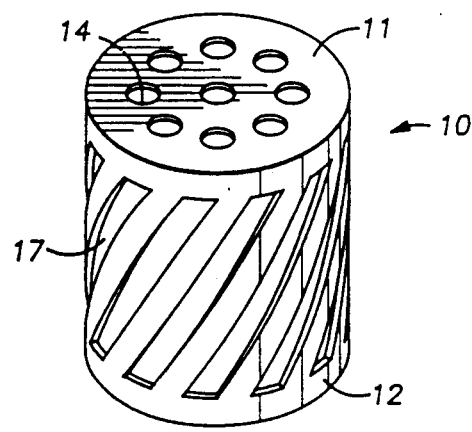
FIG. 4 is a depiction of a cylindrical catalytic distillation structure container having circular openings in the ends and longitudinally spiralled slotted openings in the wall.

In FIGS. 1-4 the difference between the embodiments lies in the type of openings in the ends 11 or wall 12 of the cylindrical container. In FIG. 1 the openings in both the ends 11 and wall 12 are in the form of circular ports 14. In FIG. 2 the openings in the wall 12 are in the form of longitudinal slots 15. In FIG. 3 additional distillation surface is provided in the form of longitudinal fins 16 extending radially along one side of each slot 15. In FIG. 4 the openings in the wall 12 are in the form of longitudinally spiralled slots 17.

Figure 5:
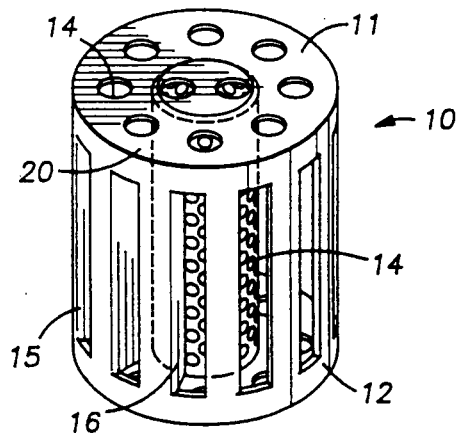
FIG. 5 is a depiction of an annular cylindrical catalytic distillation structure container wherein the catalyst component is disposed within the annular space.
Figure 6:
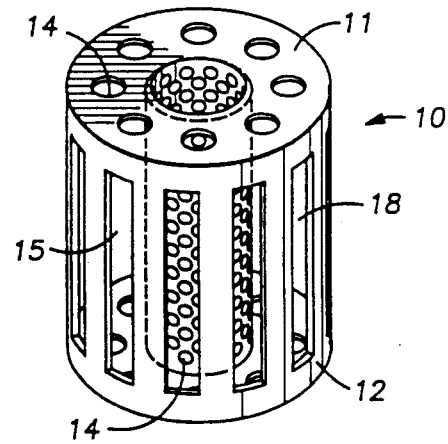
FIG. 6 is a depiction of an annular cylindrical catalytic distillation structure container wherein the catalyst component is disposed within the inner cylindrical space.

In FIGS. 5 and 6 an alternative embodiment of the rigid container 10 is shown. Essentially the container comprises two axially aligned cylinders with outer wall 12 and inner wall 20 defining an annular space. In FIG. 6 only the ends of the annular space are closed and the catalyst component is placed within this annular space 18. In FIG. 5 each entire end 11 is closed and the catalyst component is disposed in the inner cylindrical space 20. Any combination of the openings discussed above may be used with the cylindrical annular containers of FIG. 5 or FIG. 6. In FIG. 5, moreover, an additional embodiment of the slotted opening arrangement is shown wherein the fins 16 extend radially inward along each slot.

If very small catalyst are used, then a porous filter or screen 22 may be inserted into the container to cover the openings.

An interesting feature of the present invention is that the opening may be preformed in the containers, i.e. before the catalysts is placed therein or the catalyst may be sealed in the containers just as food or other items are stored in cans and the perforations made just prior to loading the catalyst structure into the reactor distillation column. This is an excellent means to preserve and protect the catalyst for storage, i.e. so that a fully active backup charge may be stored without special precautions. This feature also provides a very safe form for transoceanic shipment.

The invention claimed is:

1. A catalytic distillation structure for disposition into a distillation column reactor, comprising a particulate catalyst component disposed in a rigid hollow cylinder closed at both ends having distillation surfaces thereon and circular ports in the ends and longitudinally slotted ports in the walls to allow free passage of gas and vapors, both the length and diameter of said hollow cylinder being substantially smaller than the corresponding dimensions of said distillation column reactor.

2. The catalytic distillation structure of claim 1 further comprising a longitudinal fin extending radially from one side of each of said slotted ports.

3. The catalytic distillation structure of claim 1 wherein said openings are smaller than the particles of said catalyst component.

4. The catalytic distillation structure of claim 1 wherein said openings are larger than the particles of said catalyst component and further comprising a porous lining to retain said particles within said container.

5. The catalytic distillation structure of claim 1 wherein the capacity of said hollow cylinder is between ½ to 64 fluid ounces.

6. The catalytic distillation structure of claim 1 wherein said openings are covered with a porous liner.

7. A catalytic distillation structure for disposition into a distillation column reactor, comprising a particulate catalyst component disposed in a rigid cylinder closed at both ends having distillation surfaces thereon and circular ports in said closed ends and longitudinally spiralled slotted ports in the walls of said hollow cylinder to allow free passage of gas and vapors, both the length and diameter of said cylinder being substantially smaller than the corresponding dimensions of said distillation column reactor.

8. The catalytic distillation structure of claim 7, further comprising a longitudinal fin extending radially from one side of each of said slotted ports.

9. The catalytic distillation structure of claim 7 wherein the capacity of said annular space is between ½ to 64 fluid ounces.

10. The catalytic distillation structure of claim 7 wherein said openings are covered with a porous material.

11. A catalytic distillation structure for disposition into a distillation column reactor, comprising a particulate catalyst component disposed in a pair of rigid axially aligned cylinders defining an annular space closed at both ends having distillation surfaces thereon and circular ports in said closed ends and longitudinal slotted ports in the walls of said annular space to allow free passage of gas and vapors, both the length and diameter of said closed annular space being substantially smaller than the corresponding dimensions of said distillation column reactor.

12. The catalytic distillation structure of claim 11 wherein said openings are covered with a porous material.

13. A catalytic distillation structure for disposition into a distillation column reactor, comprising a particulate catalyst component disposed in a pair of rigid axially aligned cylinders defining an annular space closed at both ends having distillation surfaces thereon and circular ports in said closed ends and longitudinally spiralled slots in the walls of said annular space to allow free passage of gas and vapors, both the length and diameter of said closed annular space being substantially smaller than the corresponding dimensions of said distillation column reactor.

14. The catalytic distillation structure of claim 13 wherein said openings are covered with a porous material.

15. A catalytic distillation structure for disposition into a distillation column reactor, comprising a particulate catalyst component disposed in a hollow rigid cylindrical container having distillation surfaces thereon and openings to allow free passage of gas and vapors, both the length and diameter of said container being substantially smaller than the corresponding dimensions of said distillation column reactor.

16. The catalytic distillation structure of claim 15 wherein said openings comprise circular ports in the ends and wall of said hollow cylinder.

17. A catalytic distillation structure for disposition into a distillation column reactor, comprising a particulate catalyst component disposed in a rigid container having distillation surfaces thereon and openings to allow free passage of gas and vapors, the volume of said container being about $1.0 \times 10^{-7}$ to $7.0 \times 10^{-5}$ the volume of said distillation column reactor volume.

* * * * *